United States Patent [19]

Inoue

[11] Patent Number: 5,315,841
[45] Date of Patent: May 31, 1994

[54] CONTROL APPARATUS FOR USE IN AUTOMOTIVE AIR CONDITIONING SYSTEM

[75] Inventor: Atsuo Inoue, Gunma, Japan
[73] Assignee: Sanden Corporation, Isesaki, Japan
[21] Appl. No.: 2,019
[22] Filed: Jan. 8, 1993
[51] Int. Cl.⁵ .............................................. F25B 49/02
[52] U.S. Cl. ...................................... 62/228.3; 62/229
[58] Field of Search ................... 62/229, 228.5, 228.3, 62/228.1, 228.4, 227, 226; 236/78 D

[56] References Cited

U.S. PATENT DOCUMENTS

| | | |
|---|---|---|
| 4,843,834 | 7/1989 | Inoue et al. ..................... 62/226 X |
| 4,848,099 | 7/1989 | Beckey et al. ................... 236/78 D |
| 5,148,685 | 9/1992 | Takano et al. ..................... 62/229 |

Primary Examiner—Harry B. Tanner
Attorney, Agent, or Firm—Baker & Botts

[57] ABSTRACT

The present invention is directed to a control apparatus for use in an automotive air conditioning system which includes a variable capacity type refrigerant compressor. The automotive air conditioning system comprises a refrigerant circuit including a refrigerant compressor with an externally controlled variable capacity control mechanism and an evaporator connected to a suction chamber of the compressor, and a control apparatus which controls operation thereof. The control apparatus includes an adjusting device for adjusting a pressure control point in the compressor suction chamber. At the time operation of the refrigerant circuit is initiated, the pressure control point of the compressor suction chamber is adjusted to a predetermined constant value which is determined by air temperature immediately downstream from the evaporator. Shortly thereafter, but still during the initial stage of operation of the refrigerant circuit, the pressure control point of the compressor suction chamber is varied by a proportional control action as the air temperature immediately downstream from the evaporator becomes equal to or lower than a predetermined value. Accordingly, a passenger compartment of the automobile can be more adequately air conditioned throughout the initial stage of operation of the automotive air conditioning system.

5 Claims, 5 Drawing Sheets

CONTROL APPARATUS FOR USE IN AUTOMOTIVE AIR CONDITIONING SYSTEM

BACKGROUND OF THE INVENTION

1. Field Of The Invention

The present invention relates to an automotive air conditioning system, and more particularly, to a control apparatus for controlling operation of an automotive air conditioning system which includes an externally controlled variable capacity type refrigerant compressor.

2. Description Of The Prior Art

Control apparatuses for controlling operation of an automotive air conditioning system which includes an externally controlled variable capacity type refrigerant compressor are well known in the art.

According to one conventional control apparatus, during the initial operation of an automotive air conditioning system including a variable capacity type refrigerant compressor, air temperature Te' immediately downstream from an evaporator is controlled as indicated by dashed lines in FIGS. 5 and 6. With reference to FIGS. 5 and 6, from a time t0 when operation of the air conditioning system is initiated to a time t1' when the temperature Te' drops to a certain value T3 which is slightly greater than a set temperature Tset, the control apparatus maintains a pressure control point in a suction chamber of the compressor at a minimum boundary value of 1.0 kg/cm$^2$G to thereby quickly drop temperature Te'. This is accomplished by the control apparatus by outputting an electric signal having a certain amperage Ip1 to an externally controlled variable capacity control mechanism of the compressor. Once the temperature Te' drops to value T3, the pressure control point in the compressor suction chamber is varied to cause temperature Te' to approach set temperature Tset. This is accomplished by the control apparatus by outputting another electric signal having an amperage determined by the proportional control action of the control apparatus. The proportional control action is initialized at amperage Ip1.

As a consequence of the operation of the above conventional automotive air conditioning system, during the initial operation of the system, the air temperature Te' immediately downstream from the evaporator overshoots the set temperature Tset by an amount which is significant enough to delay the time period required for temperature Te' to approach the set temperature Tset. Accordingly, the passenger compartment of the automobile cannot be adequately air conditioned during the initial operation of the automotive air conditioning system.

SUMMARY OF THE INVENTION

Accordingly, it is an object of the present invention to provide an automotive air conditioning system which can adequately air condition a passenger compartment of an automobile during initial operation thereof.

The automotive air conditioning system of the present invention includes a refrigerant circuit having a refrigerant compressor with an externally controlled variable capacity control mechanism and an evaporator connected to a suction chamber of the refrigerant compressor. A fan is associated with the evaporator to move air through an exterior surface of the evaporator. A control mechanism controls operation of the refrigerant circuit.

The control mechanism includes the following devices. A temperature sensing device senses air temperature immediately downstream from the evaporator. A first pressure determining device determines a first pressure value of a pressure control point in the suction chamber of the compressor according to the air temperature immediately downstream from the evaporator at a time immediately before initiation of operation of the refrigerant circuit. A comparing device compares the air temperature immediately downstream from the evaporator during operation of the refrigerant circuit to a predetermined temperature higher than a set temperature to determine whether the air temperature is higher than the predetermined temperature. A second pressure determining device determines a second pressure value of the pressure control point in the suction chamber according to a predetermined thermal gradient when the air temperature immediately downstream from the evaporator approaches the predetermined temperature from a value higher than the predetermined temperature. A carrying out device carries out operation of proportional control action which includes a value obtained by subtracting the temperature of air immediately downstream from the evaporator during the operation of said refrigerant circuit from the set temperature.

A pressure adjusting device adjusts from a first pressure condition in which the pressure control point in the suction chamber of the compressor is at the first pressure value to a second pressure condition in which the pressure control point is adjusted to vary proportionally when the air temperature immediately downstream from the evaporator is equal to or lower than the predetermined temperature. A feedback control device coupled to the pressure adjusting device provides proportional control by supplying a differential temperature value to the pressure adjusting device determined by subtracting the air temperature immediately downstream from the evaporator from the set temperature.

DETAILED DESCRIPTION OF THE PREFERRED EMBODIMENT

Figure 1:
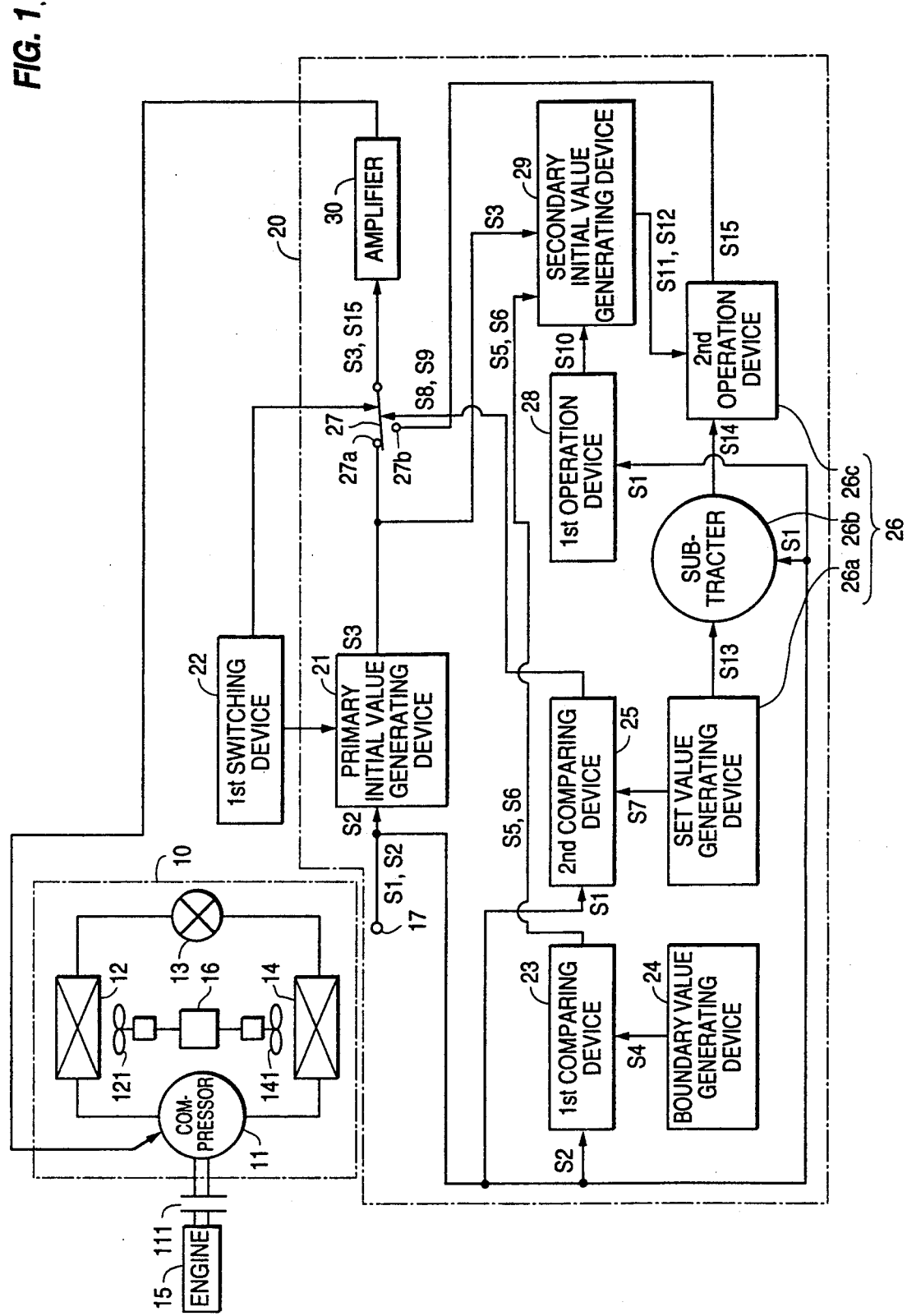
FIG. 1 illustrates a block diagram of an automotive air conditioning system which includes an externally controlled variable capacity type refrigerant compressor.

With reference to FIG. 1 illustrating a block diagram of an automotive air conditioning system in accordance with one embodiment of the present invention, the automotive air conditioning system includes refrigerant circuit 10 and control apparatus 20 which controls operation of the automotive air conditioning system. Refrigerant circuit 10 includes refrigerant compressor 11 with an externally controlled variable capacity control mechanism (not shown), condenser 12, expansion device 13 and evaporator 14 connected in series. An outlet of evaporator 14 is connected to a suction chamber of compressor 11. Electromagnetic clutch 111 is fixedly mounted on compressor 11, and intermittently transmits the power derived from an external power source, such as engine 15 of an automobile, to a drive shaft of the compressor 11 in order to intermittently operate compressor 11. Refrigerant circuit 10 further includes condenser fan 121 which is associated with condenser 12 to pass air through an exterior surface of condenser 12 by virtue of operation thereof, and evaporator fan 141 which is associated with evaporator 14 to pass air through an exterior surface of evaporator 14 by virtue of operation thereof. Condenser fan 121 and evaporator fan 141 receive electric power from DC battery 16 installed in an engine compartment of the automobile.

Control apparatus 20 includes thermosensor 17, primary initial value generating device 21, first comparing device 23, boundary value generating device 24, second comparing device 25, set value generating device 26a, subtracter 26b, first operation device 28, second operation device 26c, secondary initial value generating device 29, second switching device 27, and amplifier 30 as described in detail below.

Thermosensor 17, which is associated with evaporator 14, detects air temperature Te immediately downstream from evaporator 14 within a predetermined short time interval $\Delta t$, and generates first electric signal S1 representing the detected air temperature Te. Thermosensor 17 further detects air temperature Tea immediately downstream from evaporator 14 at a time immediately before initial operation of compressor 11, and generates second electric signal S2 representing the initial detected air temperature Tea. Thermosensor 17 is connected to a primary initial value generating device 21 which receives second electric signal S2. Primary initial value generating device 21 is further connected to first switching device 22 which is an on/off switch for the automotive air conditioning system.

When first switching device 22 is turned on to cool the air in a passenger compartment of the automobile, operation of evaporator fan 141 and condenser fan 121 is initiated. Concurrently, operation of control apparatus 20 is initiated by enabling second switching device 27 to connect primary initial value generating device 21 to amplifier 30 through first terminal 27a thereof. This energizes an electromagnetic coil (not shown) of electromagnetic clutch 111 to initiate operation of compressor 11. When compressor 11 operates, compressed gaseous refrigerant flows to condenser 12 where a first heat exchange operation occurs. Condensed refrigerant from condenser 12 then is expanded at expansion device 13 before an evaporation occurs at evaporator 14 where a second heat exchange operation occurs. Thereafter, vaporized refrigerant in evaporator 14 returns to compressor 11. As long as compressor 11 operates, the above-mentioned operations are repeated.

During initial operation of control apparatus 20, primary initial value generating device 21 processes second electric signal S2 from thermosensor 17 to generate third electrical signal S3. Amperage Ia of electric signal S3 varies in response to changes in initial detected temperature Tea. Generation of third electric signal S3 at primary control value generating device 21 is described below.

Figure 2:
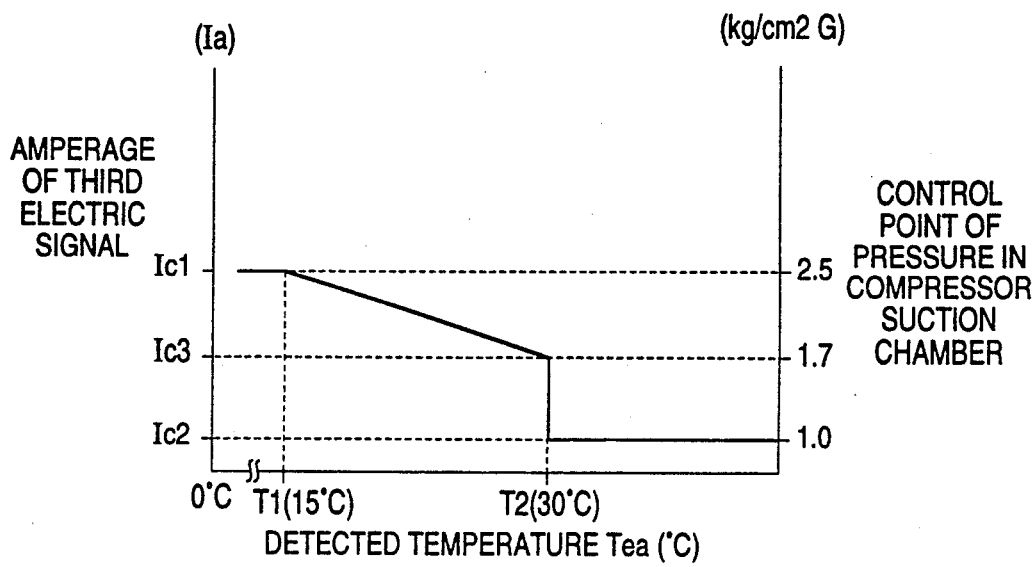
FIG. 2 is a graph showing a relationship between amperage of a third electric signal, a pressure control point in a compressor suction chamber and a detected temperature Tea.

With reference to FIG. 2, when the initial detected temperature Tea is equal to or lower than a predetermined first boundary value T1, e.g., 15° C., amperage Ia of third electric signal S3 is maintained at a first constant value Ic1 which adjusts the pressure control point in the compressor suction chamber to 2.5 kg/cm$^2$G. When the initial detected temperature Tea is equal to or higher than a predetermined second boundary value T2, e.g., 30° C., which is higher than the predetermined first boundary value T1, amperage Ia of third electric signal S3 is maintained at a second constant value Ic2 which adjusts the pressure control point in the compressor suction chamber to 1.0 kg/cm$^2$G. Furthermore, when the initial detected temperature Tea is higher than the predetermined first boundary value T1 but is lower the predetermined second boundary value T2, amperage Ia of third electric signal S3 varies in a range between the first constant value Ic1 and a third constant value Ic3 which adjusts the pressure control point to 1.7 kg/cm$^2$G.

First comparing device 23 also receives second electric signal S2 from thermosensor 17. First comparing device 23 is further connected to a boundary value generating device 24 which provides fourth electric signal S4 representing the predetermined second boundary value T2. First comparing device 23 processes second electric signal S2 and fourth electric signal S4 to determine whether the detected temperature Tea is equal to or higher than the predetermined second boundary value T2. In this comparing process, if the initial detected temperature Tea is equal to or higher than the predetermined second boundary value T2, first comparing device 23 generates a fifth electric signal S5 representing this circumstance. On the other hand, if the initial detected temperature Tea is lower than the predetermined second boundary value T2, first comparing device 23 generates a sixth electric signal S6 representing the alternative circumstance.

Second comparing device 25, which is connected to thermosensor 17, receives first electric signal S1 representing the detected temperature Te. Second comparing device 25 is further connected to set value generating device 26a in which seventh electric signal S7 representing third boundary value T3 is generated. Third boundary value T3 is higher than a set air temperature Tset immediately downstream from evaporator 14 by a predetermined amount $\Delta$Tset. Usually, third boundary value T3 is in a range between the predetermined first and second boundary values T1 and T2. Second comparing device 25 processes first electric signal S1 from thermosensor 17 and seventh electric signal S7 from the set value generating device 26a to determine whether the detected temperature Te is higher than third boundary value T3. As described in further detail below, set value generating device 26a together with subtracter 26b and second operation device 26c form control device 26 which carries out a proportional control action.

In this comparing process, if the detected temperature Te is higher than third boundary value T3, second comparing device 25 generates an eighth electric signal S8 representing this circumstance. On the other hand, if the detected temperature Te is equal to or lower than the third boundary value T3, second comparing device 25 generates a ninth electric signal S9 representing this circumstance.

First operation device 28, which also is connected to thermosensor 17, receives first electric signal S1 representing detected temperature Te. First operation device 28 processes first electric signal S1 in accordance with the following equation:

$$\alpha(n) = (Te(n) - Te(n-m))/\beta t \qquad (1)$$

In equation (1), the appended symbols (n) and (n−m) indicate the ordinal number of the detected temperature Te. $\alpha(n)$ is a thermal gradient of the detected temperature Te(n) with respect to a predetermined short time period $\beta t$ at a time immediately before detected temperature Te(n) reaches third boundary value T3 from a higher value side thereof. In the term Te(n−m), m is a quotient of $\beta t/\Delta t$, but is a whole number because $\beta t$ is predetermined to be a multiple of $\Delta t$.

First operation device 28, which generates a tenth electric signal S10 representing the thermal gradient $\alpha(n)$, is connected to secondary initial value generating device 29 to provide tenth electric signal S10 thereto. Secondary initial value generating device 29 is further connected to primary initial value generating device 21 from which it receives third electric signal S3. Secondary initial value generating device 29 is further connected to first comparing device 23 from which it receives fifth or sixth electric signals S5 or S6. Secondary initial value generating device 29 processes fifth or sixth electric signals S5 or S6, third electric signal S3 and tenth electric signal S10 as described below.

When secondary initial value generating device 29 receives sixth electric signal S6 representing the circumstance in which detected temperature Tea is lower than predetermined second boundary value T2, secondary initial value generating device 29 generates eleventh electric signal S11 which is identical to third electric signal S3 having amperage Ia which varies in response to changes in the detected temperature Tea. On the other hand, when secondary initial value generating device 29 receives fifth electric signal S5 representing the alternative circumstance in which detected temperature Tea is equal to or higher than predetermined second boundary value T2, secondary control value generating device 29 generates twelfth electric signal S12 having amperage Ib which varies in response to changes in the thermal gradient $\alpha(n)$. Generation of twelfth electric signal S12 by secondary initial value generating device 29 is described below.

Figure 3:
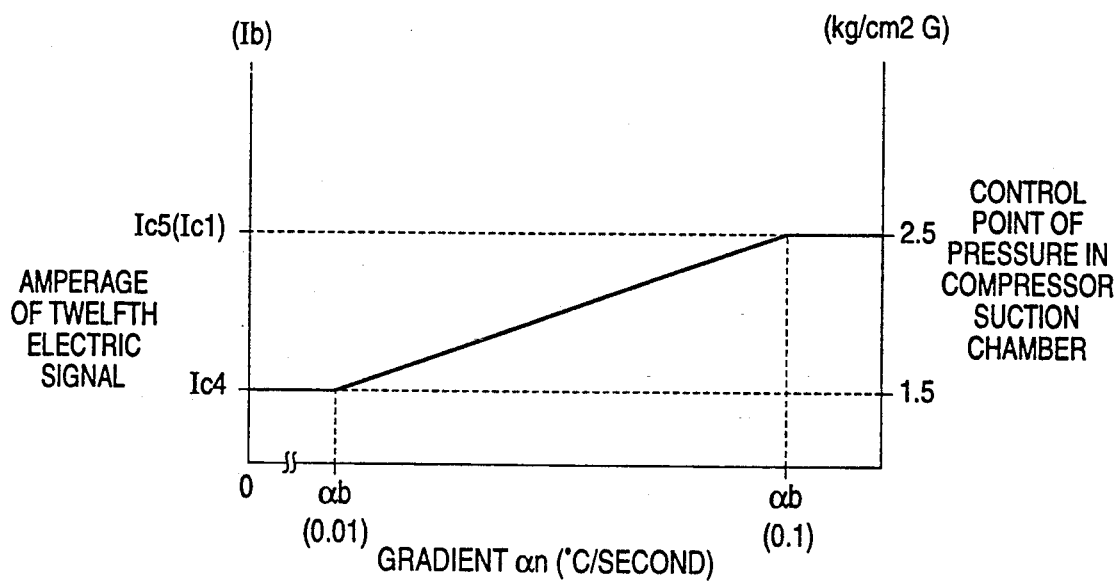
FIG. 3 is a graph showing a relationship between amperage of a twelfth electric signal, the pressure control point in a compressor suction chamber and a thermal gradient αn.

With reference to FIG. 3, when the thermal gradient $\alpha(n)$ is equal to or smaller than a predetermined first boundary value $\alpha a$, e.g., 0.01° C./sec., amperage Ib of twelfth electric signal S12 is maintained at a fourth constant value Ic4 which adjusts the pressure control point in the compressor suction chamber pressure to 1.5 kg/cm²G. When the thermal gradient $\alpha(n)$ is equal to or greater than a predetermined second boundary value $\alpha b$, e.g., 0.1° C./sec. which is greater than the predetermined first boundary value $\alpha a$, amperage Ib of twelfth electric signal S12 is maintained at a fifth constant value Ic5. Since fifth constant value Ic5 is equal to the first constant value Ic1 shown in FIG. 2, it adjusts the pressure control point in the compressor suction chamber pressure to 2.5 kg/cm²G. Furthermore, when the thermal gradient $\alpha(n)$ is greater than the predetermined first value $\alpha a$ but smaller than the predetermined second value $\alpha b$, amperage Ib of twelfth electric signal S12 varies in a range between the fourth and fifth constant values Ic4 and Ic5 so that the pressure control point in the compressor suction chamber pressure varies within a range between 2.5 kg/cm²G and 1.5 kg/cm²G.

Secondary initial value generating device 29 is connected to second operation device 26c which receives eleventh or twelfth electric signals S11 or S12. Set value generating device 26a further generates a thirteenth electric signal S13 which represents the set air temperature Tset immediately downstream from evaporator 14. Set value generating device 26a is further connected to subtracter 26b which is further connected to thermosensor 17 to receive first electric signal S1 representing the detected temperature Te. Subtracter 26b processes the thirteenth electric signal S13 and first electric signal S1 by subtracting the detected temperature Te from the set temperature Tset. This subtraction is shown by the following equation:

$$\Delta Tv = Tset - Te \qquad (2)$$

The subtracter 26b generates a fourteenth electric signal S14 representing $\Delta Tv$ which is supplied to second operation device 26c.

Second operation device 26c processes the eleventh or twelfth electric signals S11 or S12 sent from secondary initial value generating device 29, and fourteenth electric signal S14 sent from subtracter 26b in accordance with the following equation:

$$I(l) = I(l-1) + Kp(\Delta Tv(l) - \Delta Tv(l-1)) \qquad (3)$$

In equation (3), Kp is a factor of proportionality. Appended symbols (l) or (l−1) indicate ordinal numbers of the values processed in second operation device 26c.

When second operation device 26c receives eleventh electric signal S11, if appended symbol (l) is 1, the term I(l−1) becomes Ia. On the other hand, when second operation device 26c receives twelfth electric signal S12, if appended symbol (l) is 1, the term I(l−1) becomes Ib. Thus, second operation device 26c generates fifteenth electric signal S15 having various amperages I(l).

Second switching device 27 receives the eighth or ninth electric signals S8 or S9 from second comparing device 25. When second switching device 27 receives ninth electric signal S9, that is, when the detected temperature Te is equal to or lower than the third boundary value T3, second switching device 27 operates to connect second operation device 26c to amplifier 30 through second terminal 27b thereof. As a consequence, amperage I(l) of fifteenth electric signal S15 is amplified to amperage $G_f(I(l))$ by amplifier 30 where $G_f$ represents the gain of amplifier 30. Electric current $G_f(I(l))$ is supplied to a solenoid (not shown) of the externally controlled variable capacity control mechanism of the compressor. On the other hand, when second switching device 27 receives eighth electric signal S8, that is, when detected temperature Te is higher than third boundary value T3, the connection between primary initial value generating device 21 and amplifier 30 is maintained so that amperage Ia of third electric signal S3 is amplified to be amperage $G_f(Ia)$ by amplifier 30. Electric current $G_f(Ia)$ then is supplied to the solenoid (not shown) of the externally controlled variable capacity control mechanism of the compressor.

In the above embodiment of the present invention, when the electric current supplied to the solenoid of the externally controlled variable capacity control mechanism of the compressor increases, the pressure control point in the compressor suction chamber increases to a greater value. When the electric current supplied to the solenoid of the externally controlled variable capacity control mechanism of the compressor decreases, the pressure control point in the compressor suction chamber decreases to a smaller value.

Figure 4:
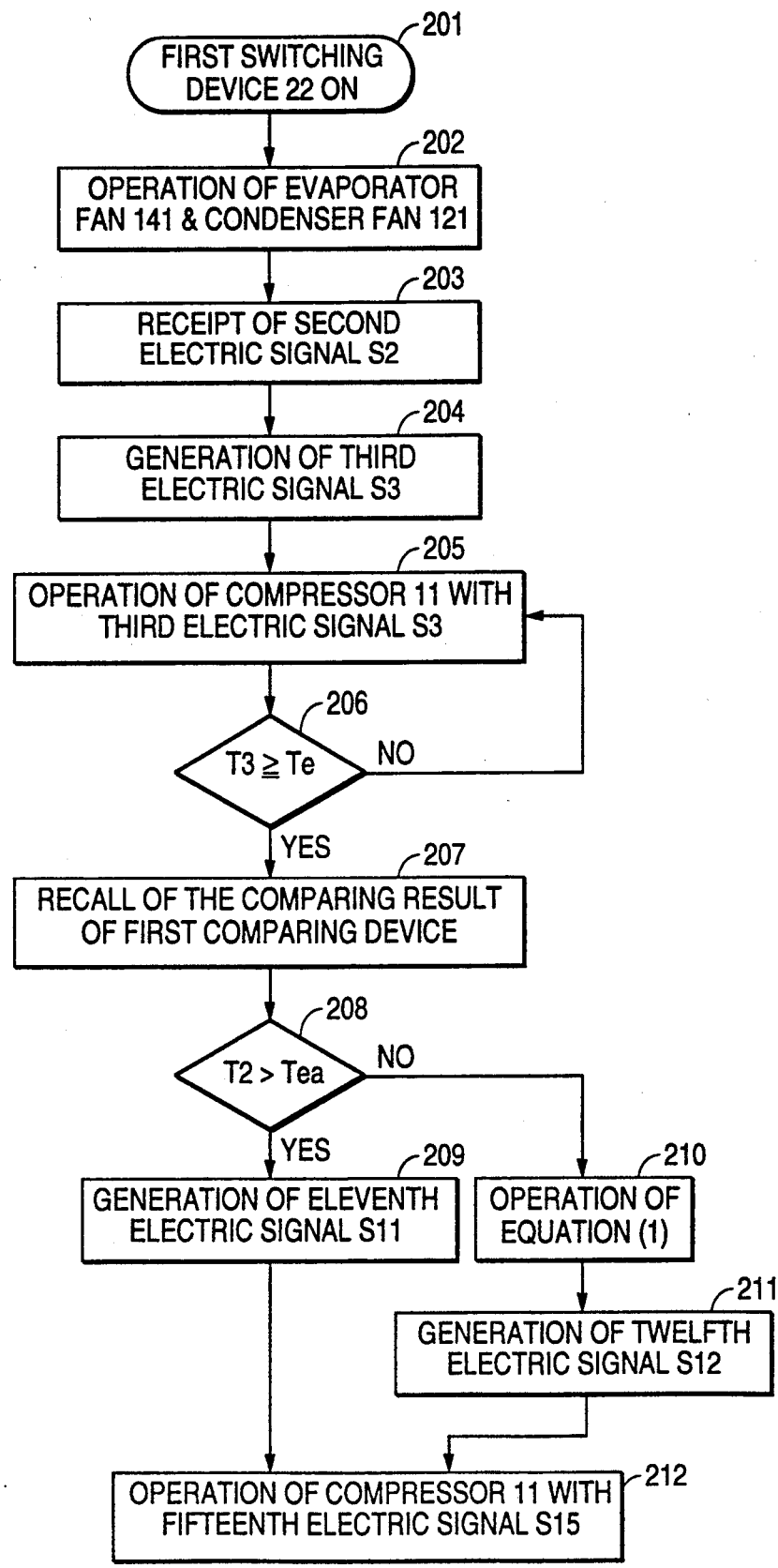
FIG. 4 is a flow chart illustrating operation of the automotive air conditioning system shown in FIG. 1 during an initial stage of operation.

Operation of the automotive air conditioning system in accordance with the above embodiment of the present invention is described below. With reference to FIG. 4, initially, when it is desired to cool the passenger compartment of the automobile, first switching device 22 is turned on to initiate operation of the automotive air conditioning system in step 201. When first switching device 22 is turned on, operation of condenser fan 121 and evaporator fan 141 is initiated in step 202, and concurrently, operation of control apparatus 20 is initiated so that second switching device 27 operates to connect primary initial value generating device 21 to amplifier 30 through first terminal 27a thereof.

As represented by step 203, when primary initial value generating device 21 is connected to amplifier 30, second electric signal S2 representing the detected temperature Tea is sent to primary initial value generating device 21 and first comparing device 23 from thermosensor 17. At step 204, primary initial value generating device 21 processes second electric signal S2 to generate third electric signal S3 having various amperages Ia shown in FIG. 2.

At step 205, operation of compressor 11 is initiated by applying power from the engine of the automobile through electromagnetic clutch 111. At the same time, electric signal S3 is supplied from primary initial value generating device 21 to amplifier 30 through first terminal 27a of second switching device 27. Electric current $G_f(Ia)$ is supplied to the solenoid of the externally controlled capacity control mechanism of the compressor to adjust the pressure control point in the compressor suction chamber to a predetermined value. Furthermore, if detected temperature Tea is equal to or higher than predetermined second boundary value T2, amperage Ia of third electric signal S3 is maintained at second constant value Ic2 so that the pressure control point in the compressor suction chamber is maintained at 1.0 kg/cm²G. On the other hand, if detected temperature Tea is lower than predetermined second boundary value T2, amperage Ia of third electric signal S3 is greater than third constant value Ic3 so that the pressure control point in the compressor suction chamber is maintained at a value greater than 1.7 kg/cm²G.

At step 206, second comparing device 25 compares whether detected temperature Te is higher than third boundary value T3. If detected temperature Te is higher than third boundary value T3, step 206 returns to step 205. On the other hand, if detected temperature Te is equal to or lower than third boundary value T3, step 206 proceeds to step 207. At step 207, second switching device 27 operates to connect second operation device 26c to amplifier 30 through second terminal 27b thereof, and concurrently, the comparing result of first comparing device 23 is recalled.

At step 208, upon recalling the comparing result of first comparing device 23, if the detected temperature Tea is lower than the predetermined second boundary value T2, operation proceeds to step 209. At step 209, eleventh electric signal S11, which is identical to third electric signal S3, is supplied to second operation device 26c from secondary initial value generating device 29, and the operation proceeds to step 212.

On the other hand, upon recalling the comparing result of first comparing device 23, if initial detected temperature Tea is equal to or higher than predetermined second boundary value T2, operation proceeds to step 210. At step 210, the operation of equation (1) is carried out in first operation device 28 to generate tenth electric signal S10. At step 211, tenth electric signal S10 is processed in secondary initial value generating device 29 to generate twelfth electric signal S12. Then, twelfth electric signal S12 is supplied to second operation device 26c from secondary initial value generating device 29, and the operation proceeds to step 212.

At step 212, the operation of equation (3) is carried out in second operation device 26c to generate fifteenth electric signal S15 having amperage I(l), and this signal S15 is supplied to amplifier 30 through second terminal 27b of second switching device 27. Then, electric current $G_f(I(l))$ is supplied to the solenoid of the externally controlled variable capacity control mechanism of compressor 11 to adjust the pressure control point in the compressor suction chamber at various values so that temperature Te converges at set temperature Tset. Step 212 continues until operation of the automotive air conditioning system is terminated.

Figure 5:
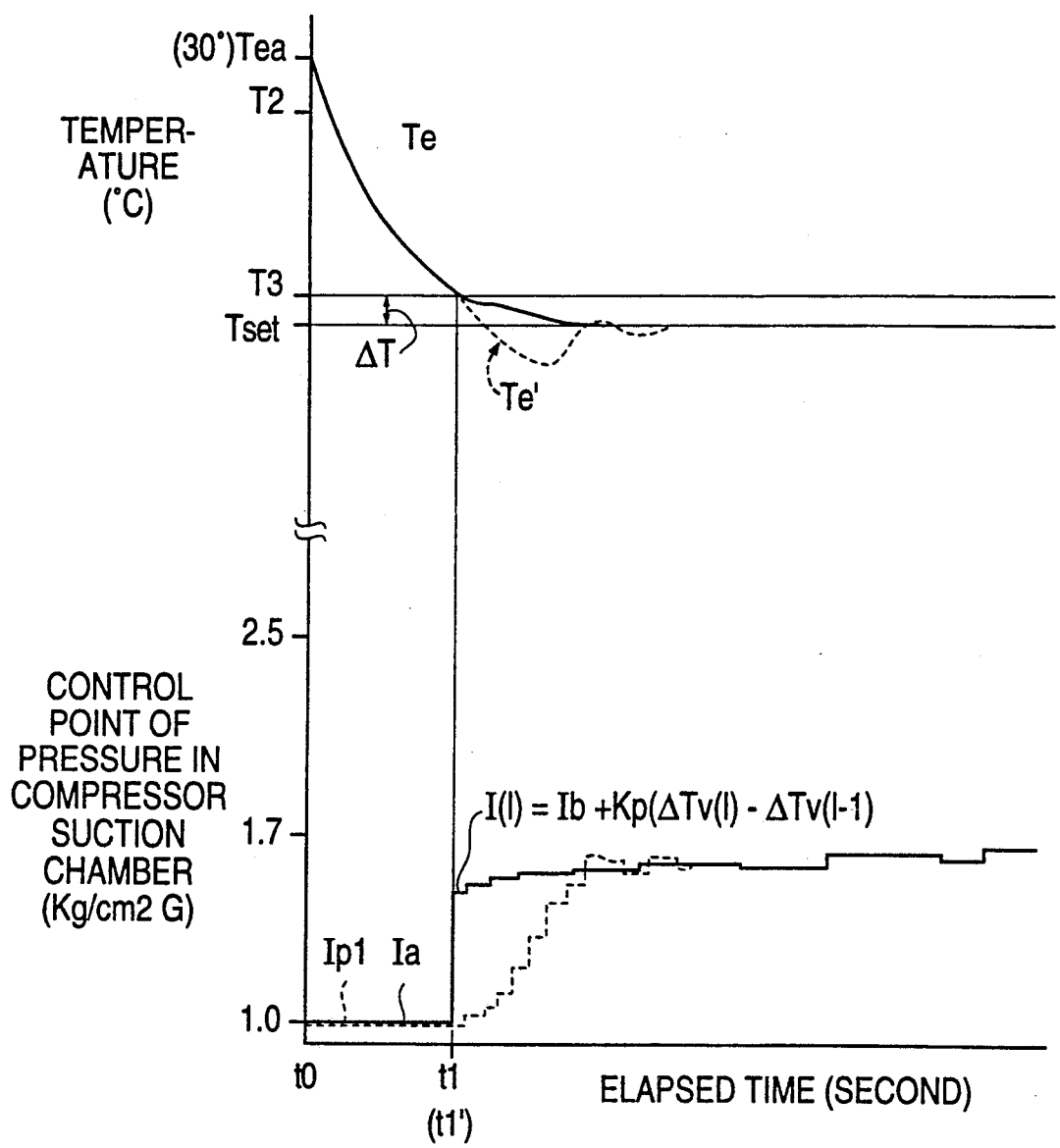
FIG. 5 illustrates a cool-down characteristic during initial operation of an automotive air conditioning system in a situation where air temperature immediately downstream from an evaporator at a time immediately before operation of a refrigerant circuit is initiated is equal to or higher than a boundary value. In the drawing, a solid line indicates the cool-down characteristic of the automotive air conditioning system shown in FIG. 1, and a dashed line indicates the cool-down characteristic of the automotive air conditioning system in accordance with a prior art embodiment.

FIG. 5 illustrates a cool-down characteristic in the initial operation stage of the automotive air conditioning system in a situation where initial detected temperature Tea is equal to or higher than predetermined second boundary value T2. More specifically, in FIG. 5, the cool-down characteristic of the automotive air conditioning system in accordance with one embodiment of the present is indicated by a solid line.

With reference to FIG. 5, from time t0 when operation of refrigerant circuit 10 is initiated to time t1 when temperature Te drops to third boundary value T3, the pressure control point in the compressor suction chamber is adjusted to 1.0 kg/cm²G by third electric signal S3 having amperage Ia at second constant value Ic2. Therefore, temperature Te quickly drops to third boundary value T3 by time t1.

Once temperature Te drops to third boundary value T3 at time t1, the pressure control point in the compressor suction chamber is adjusted by the proportional control action of control device 26. This proportional control action is initialized by twelfth electric signal S12 having amperage Ib set at a relatively larger value. Accordingly, in the initial operation stage of the automotive air conditioning system, the air temperature Te immediately downstream from evaporator 14 quickly drops without overshooting set temperature Tset. Air temperature Te quickly and effectively converges at set temperature Tset. Therefore, the passenger compartment of the automobile can be more adequately air conditioned in the initial operation stage of the automotive air conditioning system.

Figure 6:
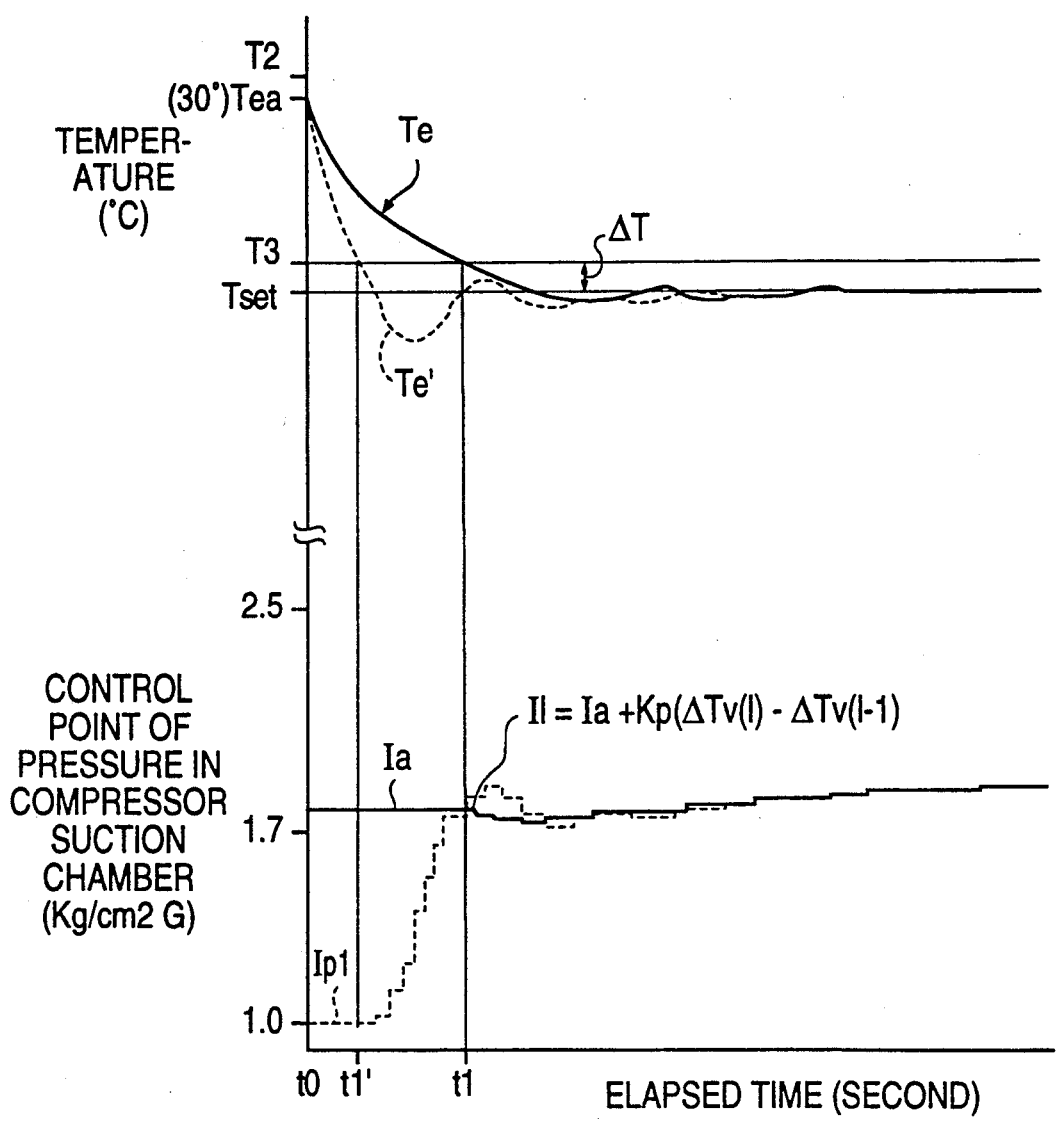
FIG. 6 illustrates a cool-down characteristic during initial operation of the automotive air conditioning system in a situation where air temperature immediately downstream from an evaporator at a time immediately before operation of the refrigerant circuit is initiated is lower than a boundary value. In the drawing, a solid line indicates the cool-down characteristic of the automotive air conditioning system shown in FIG. 1, and a dashed line indicates the cool-down characteristic of the automotive air conditioning system in accordance with a prior art embodiment.

FIG. 6 illustrates a cool-down characteristic of the automotive air conditioning system in a situation where temperature Tea is lower than predetermined second boundary value T2. More specifically, in FIG. 6, the cool-down characteristic of the automotive air conditioning system is indicated by a solid line.

With reference to FIG. 6, from time t0 when the operation of refrigerant circuit 10 is initiated to time t1 when temperature Te drops to third boundary value T3, the pressure control point in the compressor suction chamber is increased to a larger value by third electric signal S3 having amperage Ia at a relatively larger value than described above. Therefore, temperature Te gently drops to third boundary value T3 by time t1.

Once temperature Te drops to third boundary value T3 at time t1, the pressure control point in the compressor suction chamber is adjusted by the proportional control action of control device 26. This adjustment is initialized by eleventh electric signal S11 which is identical to third electric signal S3. Accordingly, in the initial operation of the automotive air conditioning system, air temperature Te immediately downstream from evaporator 14 gently drops without overshooting set temperature Tset, and air temperature Te quickly and effectively converges at set temperature Tset. Therefore, the passenger compartment of the automobile can be more adequately air conditioned during the initial operation of the automotive air conditioning system.

This invention has been described in detail in connection with a preferred embodiment. However, this embodiment is exemplary only and the invention is not restricted thereto. It will be understood by those skilled in the art that other variations and modifications can be easily made within the scope of this invention.

I claim:

1. An automotive air conditioning system comprising:
    a refrigerant circuit comprising a refrigerant compressor with an externally controlled variable capacity control mechanism and an evaporator connected to a suction chamber of said refrigerant compressor;
    air moving means for moving air through an exterior surface of said evaporator, and a control mechanism controlling operation of at least said refrigerant circuit, said control mechanism comprising:
    sensing means for sensing air temperature immediately downstream from said evaporator;
    first pressure determining means for determining a first pressure value of a pressure control point in said suction chamber of said compressor according to the air temperature immediately downstream from said evaporator at a time immediately before initiation of operation of said refrigerant circuit;
    comparing means for comparing air temperature immediately downstream from said evaporator during operation of said refrigerant circuit to a predetermined temperature higher than a set temperature to determine whether air temperature is higher than the predetermined temperature;
    second pressure determining means for determining a second pressure value of the pressure control point in said suction chamber of said compressor according to a predetermined thermal gradient when the air temperature immediately downstream from the evaporator approaches the predetermined temperature from a value higher than the predetermined temperature; and
    pressure adjusting means responsive to said first and second pressure determining means for adjusting from a first pressure condition in which the pressure control point in said suction chamber of said compressor is at the first pressure value to a second pressure condition in which the pressure control point is adjusted to vary proportionally when the air temperature immediately downstream from said evaporator is equal to or lower than the predetermined temperature.

2. The automotive air conditioning system of claim 1 wherein said control mechanism further comprises feedback control means coupled to said pressure adjusting means for providing proportional control to said pressure adjusting means by supplying a differential temperature value by subtracting air temperature immediately downstream from said evaporator from the set temperature.

3. The automotive air conditioning system of claim 2 wherein said control mechanism further comprises second comparing means for comparing air temperature immediately downstream from said evaporator at a time immediately before initiation of operation of said refrigerant circuit to a predetermined boundary temperature to determine whether air temperature is equal to or higher than the predetermined boundary temperature.

4. The automotive air conditioning system of claim 3 wherein proportional control is initialized by said first pressure value when the air temperature immediately downstream from said evaporator at a time immediately before initiation of operation of said refrigerant circuit is lower than the predetermined boundary temperature.

5. The automotive air conditioning system of claim 3 wherein proportional control is initialized by said second pressure value when the air temperature immediately downstream from said evaporator at a time immediately before initiation of operation of said refrigerant circuit is equal to or higher than the predetermined boundary temperature.

* * * * *